(12) United States Patent
Mojica

(10) Patent No.: US 12,727,602 B2
(45) Date of Patent: Sep. 8, 2026

(54) KNIFE ASSEMBLY

(71) Applicant: Outdoor Element, LLC, Englewood, CO (US)

(72) Inventor: Michael John Mojica, Englewood, CO (US)

(73) Assignee: Outdoor Element, LLC, Englewood, CO (US)

( * ) Notice: Subject to any disclaimer, the term of this patent is extended or adjusted under 35 U.S.C. 154(b) by 103 days.

(21) Appl. No.: 18/439,499

(22) Filed: Feb. 12, 2024

(65) Prior Publication Data

US 2024/0268399 A1 Aug. 15, 2024

Related U.S. Application Data

(60) Provisional application No. 63/484,430, filed on Feb. 10, 2023.

(51) Int. Cl.
*A22B 5/00* (2006.01)
*B26B 5/00* (2006.01)

(52) U.S. Cl.
CPC .............. *A22B 5/0047* (2013.01); *B26B 5/00* (2013.01)

(58) Field of Classification Search
CPC ......... A22B 5/0047; B26B 5/00; B26B 5/001; B26B 5/005; A61B 17/3213
See application file for complete search history.

(56) References Cited

U.S. PATENT DOCUMENTS

| | | | | |
|---|---|---|---|---|
| 9,364,957 | B2 * | 6/2016 | Lake | B26B 1/044 |
| 9,586,329 | B2 | 3/2017 | Schuft | |
| 10,349,664 | B2 | 7/2019 | Schuft | |
| 11,999,073 | B2 * | 6/2024 | Horne | B25G 3/26 |
| 2014/0047718 | A1 * | 2/2014 | Fellows | B26B 1/02 30/161 |
| 2014/0366387 | A1 * | 12/2014 | Schuft | B26B 5/003 30/293 |

* cited by examiner

*Primary Examiner* — Evan H Macfarlane
(74) *Attorney, Agent, or Firm* — Holland & Hart LLP

(57) ABSTRACT

A knife assembly with replaceable blades used for hunting. Specifically, embodiments include a knife assembly with a safety switch integrated with a release mechanism to reduce this risk of unintentional blade releases. In some embodiments, the knife assembly includes a handle coupled to a blade chassis assembly in a blade mounting system configured to receive a replaceable blade. The knife assembly includes a spring configured to engage with the blade, and a lock that must be manually moved to permit the spring to disengage from the blade.

12 Claims, 8 Drawing Sheets

KNIFE ASSEMBLY

CROSS-REFERENCE TO RELATED APPLICATIONS

This application claims priority of U.S. Provisional Patent Application No. 63/484,430, entitled "Knife Assembly," filed Feb. 10, 2023, which is hereby incorporated by reference in its entirety.

TECHNICAL FIELD

The present application relates generally to a safety mechanism for a knife assembly designed with replaceable blades used for hunting.

BACKGROUND

Field dressing an animal during hunting is a critical and laborious component for a hunter. Knife blade edges in knives utilized during field dressing can quicky wear down as an individual cuts through the fascia that connects the skin to the muscle in an animal. Having a quick replacement scalpel blade capability for field dressing knives has proven valuable as these styles of blades reduce time and effort. However, some quick replacement knives have created danger in this task. If the quick release mechanism is too easy to deploy, these razor-sharp blades can and have fallen off while hunters are harvesting the animal creating hazardous situations during this task. It is desirable to implement safety measures to reduce this risk of unintentional blade releases.

SUMMARY

According to an embodiment of the present invention relates to a skinning knife including a handle, a blade mounting system attached to the handle, a boss extending outward from the mounting surface, a spring acting as a part of the blade mounting system, and a mechanical safety lock that must be manually moved to allow the spring to disengage from the blade. The skinning knife includes a removable blade with a sharp edge, and a slot designed to seat in the mounting points of the blade chassis.

BRIEF DESCRIPTION OF DRAWINGS

The accompanying drawings, which are included to provide a further understanding of the embodiment and are incorporated in and constitute a part of this specification, illustrate embodiments of the disclosed device and together with the detailed description serve to explain the principles of the embodiment. In the drawings.

DETAILED DESCRIPTION

Embodiments are discussed in detail below. In describing embodiments, specific terminology is employed for the sake of clarity. However, the various embodiments are not intended to be limited to the specific terminology so selected. A person skilled in the relevant art would recognize that other equivalent parts can be employed, and other methods developed without departing from the spirit and scope of the disclosure. All references cited herein are incorporated by references as if each had been individually incorporated.

Surgical blade knives are widely used in the hunting industry. As blades can easily and quickly dull, improvements made to folding knives and retractable blade knives include replacement blades. For convenience, many blade knives with replaceable blades are tool-less, include non-slip handles, and include push buttons for quick release of a blade. However, such quick release mechanisms can result in unintended release of the blade posing safety risks.

The disclosed technology includes a knife assembly with a lock to lock a replaceable blade into the knife assembly to avoid inadvertent disengagement. Specifically, the disclosed embodiments include a safety switch integrated with a release mechanism to prevent or allow disengagement of the blade with the knife assembly.

Figure 1:
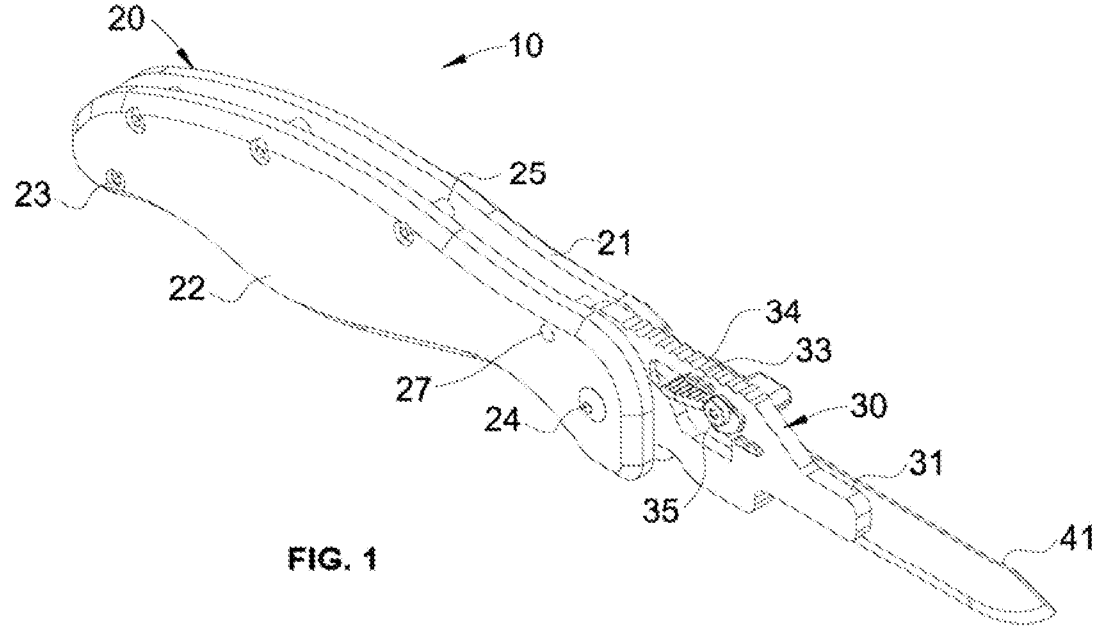
FIG. 1 shows a perspective view of the knife assembly with a safety lock and replaceable blade according to an embodiment of the disclosure.

FIG. 1 illustrates perspective view of a knife assembly 10 with a locking mechanism or lock for a replaceable blade according to an embodiment of the disclosure. The knife includes a handle 20 having the front end coupled to a blade chassis assembly 30 that is designed to receive a blade 41. The handle 20 and the blade chassis assembly 30 and the blade 41 form the knife. The knife can be constructed in many different forms including but not limited to a fixed or non-folding knife, folding knife with no blade lock associated with the handle or with a spine lock, button lock, lever lock, or a liner lock 28 as illustrated in an embodiment of the disclosure shown in FIG. 2 and FIG. 8. The handle 20 in the embodiment is designed to be grasped by the user of the knife 10. The handle 20 may be molded as a single body (e.g., injection molded from a polymer, such as polyoxymethylene). According to the current embodiment of FIG. 1, the handle 20 may include a handle front section 21 and a handle back section 22 made of various materials such as but not limited to polymers, metals, or combinations thereof that are coupled together with fasteners 23 such as screws. In the embodiment of the disclosure the handle may be separated by spacers 25 allowing sufficient space for the blade chassis assembly 30 and the blade 41 to fold about the pivot screw 24 into the handle 20 for safe storage while not in use. In some embodiments of the present disclosure, a stop pin 27 may be used as a mechanical stop for the folding of the blade chassis assembly 30 into the handle 20. The locking mechanism 33 moves, slides, or rotates behind a spring, (e.g., a cantilevered leaf spring) 34 preventing unintentional release of the blade 41. In some embodiments, the locking mechanism 33 may rotate about a locker screw 35. In some embodiments, the locker screw 35 is replaced with components that facilitate different motions of the locking mechanism 33.

Figure 2:
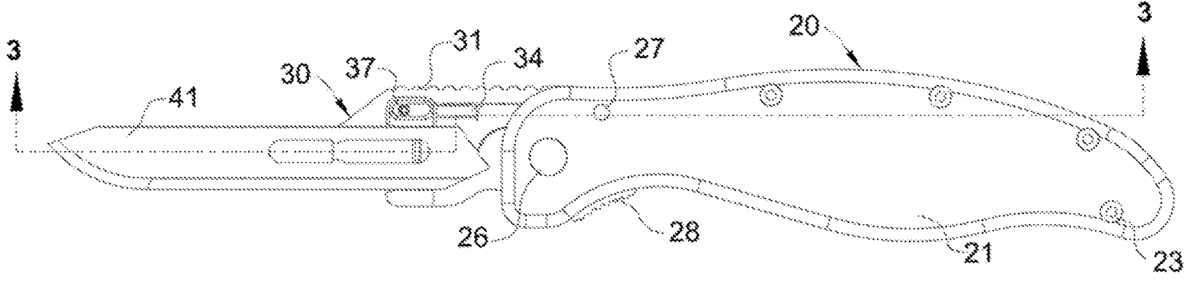
FIG. 2 is a front view of the knife assembly of FIG. 1.

FIG. 2 illustrates a front view of the knife of FIG. 1. The blade 41 is located on a front end of the knife assembly mounted on the blade chassis 31. Section line 3-3 is illustrated in FIG. 2. The blade chassis assembly 30 utilizes mechanical features and mechanisms to firmly secure the blade 41, described in detail below. When the user manually articulates the liner lock 28, the blade chassis 31 is free to rotate about the pivot 26 and pivot screw 24 allowing the blade 41 to be stored inside the handle 20 while not in use.

Figure 3:
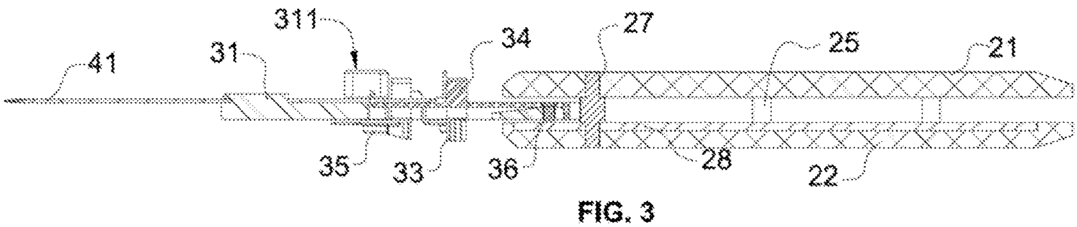
FIG. 3 is a section view of the knife assembly of FIG. 2 along line 3-3.

FIG. 3 illustrates is a sectional view of the knife assembly of FIG. 1 along line 3-3. The blade chassis 31 has a lever 311 which houses a detent pin 39, a blade chassis spring 38, and a set screw 37 as see in FIG. 13 that guides the locking mechanism 33. A fixing screw 36 holds the spring 34 into place on the blade chassis 31.

Figure 4:
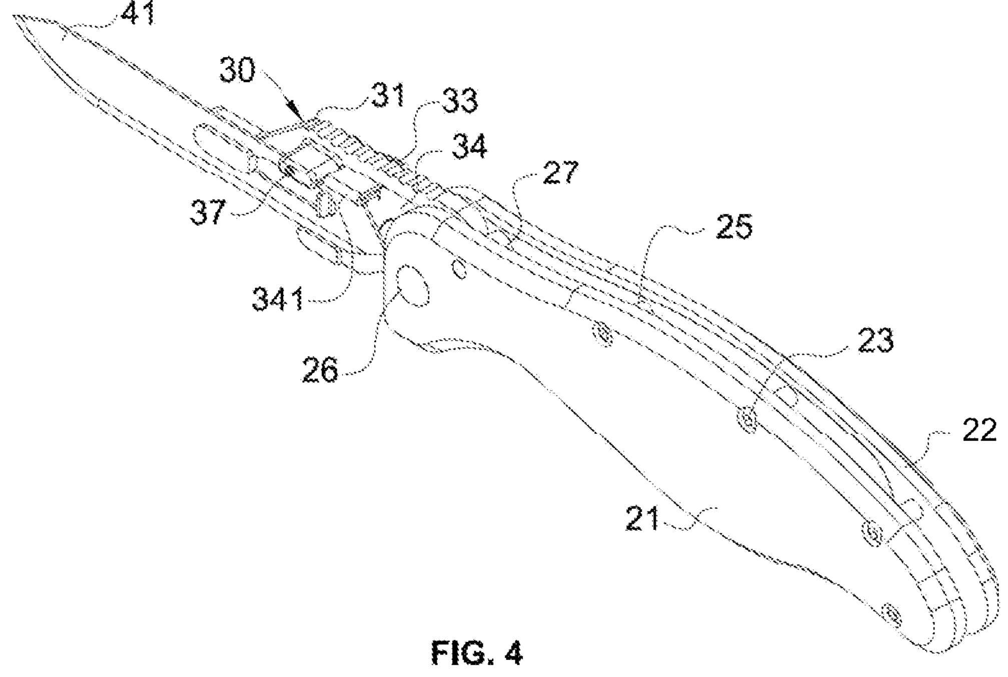
FIG. 4 is a perspective view of the knife assembly of FIG. 1 according to an embodiment of the disclosure.

FIG. 4 illustrates a perspective view of the knife assembly of FIG. 1 according to an embodiment of the disclosure. The spring 34 is bent and folded back in a manner forming a middle section 341 (e.g., pushing hem) to be used in releasing or attaching the blade 41. In some embodiments, the middle section 341 could be made of a pushing assembly fastened to the spring 34. In some embodiments, the middle section 341 may not take the form of a hem.

Figure 5:
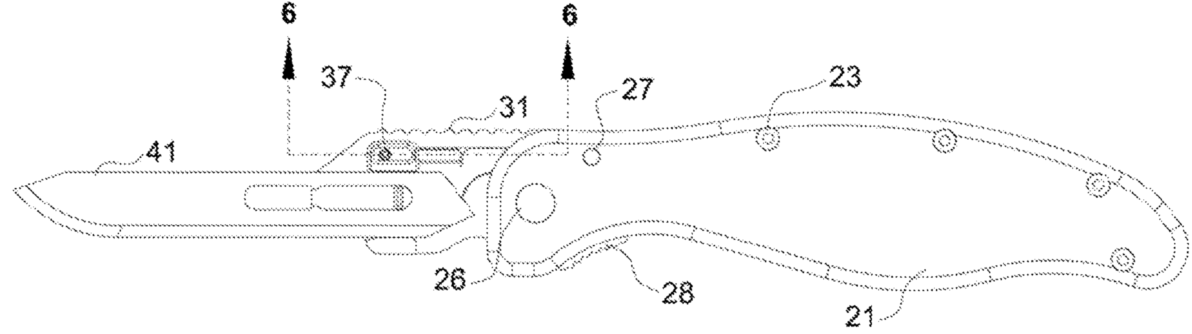
FIG. 5 front view of the knife assembly of FIG. 1 according to an embodiment of the disclosure.

FIG. 5 illustrates a front view of the knife assembly of FIG. 1 according to an embodiment of the disclosure with a section line 6-6. This section line provides further clarification and understanding for FIG. 6.

Figure 6:
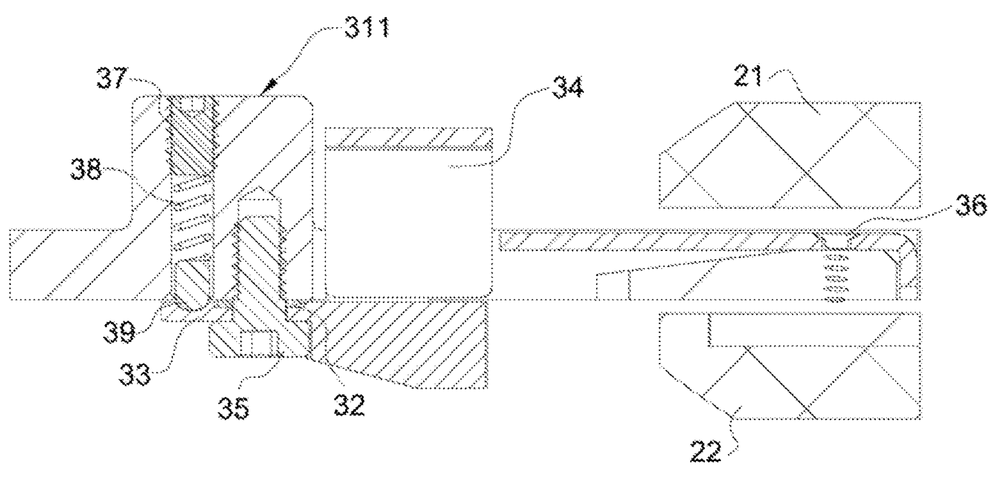
FIG. 6 is a sectional view of the knife assembly of FIG. 5 along line 6-6 according to an embodiment of the disclosure.

FIG. 6 is a sectional view of the knife assembly of FIG. 1 along line 6-6 as drawn in FIG. 5. The lever 311 of blade chassis 31 may house a set screw 37, a blade chassis spring 38, and a detent pin 39. The actuation of the locking mechanism 33 results in the set screw 37 following a channel or a grove section in the lever 311 to guide the locking mechanism 33 to locked and unlocked positions. Once the locking mechanism is the desired position (e.g., locked or unlocked), the blade chassis spring 38 and detent pin 39 provide resistance to keep the locking mechanism in place. The locking mechanism 33 may move in a linear path or a rotational path to hinder or allow movement of the middle section 341 of the spring 34. In an embodiment of the current disclosure, the locking mechanism 33 rotates about a locker screw 35 that is mounted through a hole in the locking mechanism 33, washer 32, and into the lever 311 of the blade chassis 31. The washer 32 may be made of a plurality of materials including, but not limited to steel, nylon, brass, and ceramic. Alternatively, the locking mechanism 33 may be designed with a circular boss effectively acting as a washer.

Figure 7:
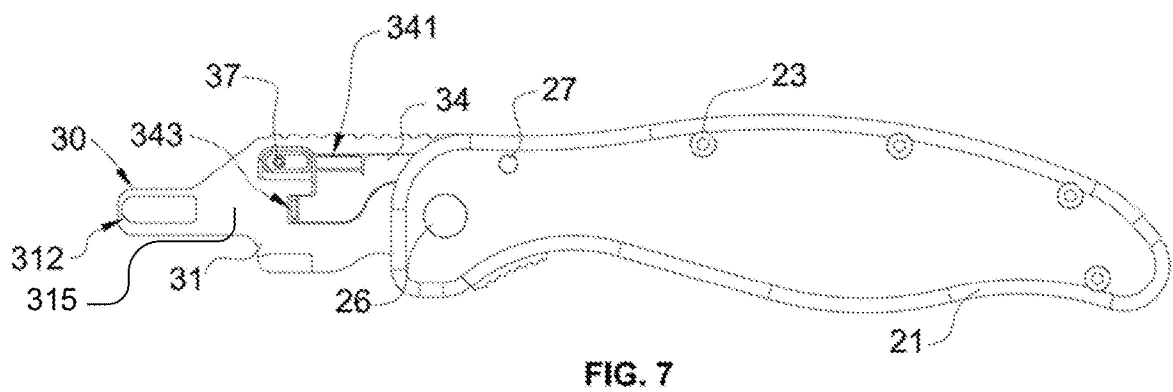
FIG. 7 is a front view of the knife body of the knife assembly FIG. 1 according to an embodiment of the disclosure.

FIG. 7 illustrates a front view of the knife assembly of FIG. 1 according to an embodiment of the disclosure without the blade 41. The blade chassis 31 may include a boss 312 with an under-lip that secures the blade 41 to the mounting surface 315. The mounting surface 315 can be defined as the plane where the surface of blade 41 meets the surface of blade chassis 31 when the blade 41 is fully fixed. The spring 34 has a middle section 341 that, in some embodiments, is bent outward from the body of the spring and then folded back over to form a hem. When the middle section 341 is depressed by the user, an outward flange 343 of the spring 34 will move equal to or below the mounting surface 315 of the blade chassis 31. This articulation will allow the blade 41 to be coupled and decoupled from the mounting surface 315.

Figure 8:
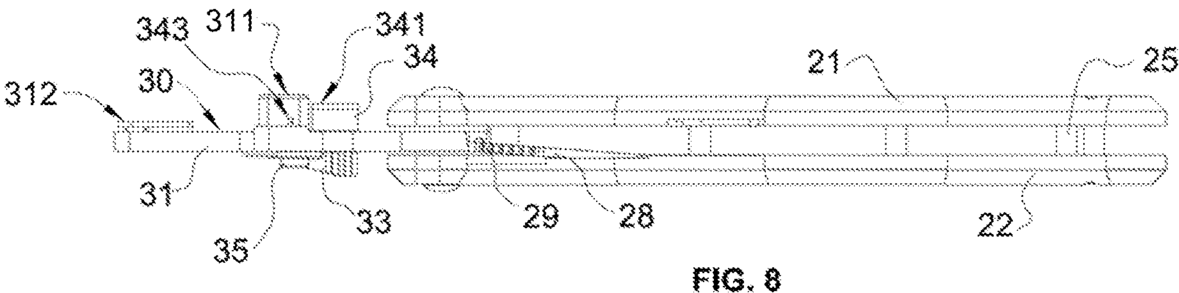
FIG. 8 is a bottom view of the knife assembly of FIG. 7 according to an embodiment of the disclosure.

FIG. 8 illustrates an orthogonal bottom view of FIG. 7 according to an embodiment of the disclosure. The locking mechanism 33 forms a mechanical stop for the middle section 341 of the spring 34 and therefore prevents the flange 343 from any movement. The flange 343 and boss 312 work together to couple a blade to the blade chassis 31. The locking mechanism 33 must be physically moved into a secondary position to allow movement of the flange 343 section of the spring 34. In the current embodiment of the disclosure in FIG. 8, the liner lock 28 is engaged with the blade chassis 31 creating a rigid body with both the handle front section 21 and the handle back section 22. Liner lock detent pin 29 is used to help lock the blade in place when closed.

Figure 9:
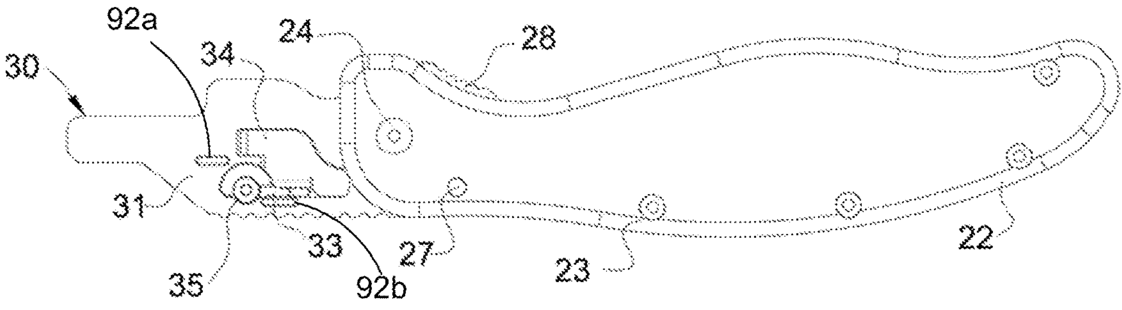
FIG. 9 is an orthogonal view from FIG. 8 of the opposite side of FIG. 7 according to an embodiment of the disclosure.

FIG. 9 illustrates an orthogonal view of the knife assembly of FIG. 1, without the blade 41 according to an embodiment of the disclosure. In the current embodiment, the blade chassis 31 has two stoppers, stopper **92*a* and stopper 92*b*, protruding outward acting as a mechanical stop for the locking mechanism 33. These stoppers prevent over articulation or rotation for the locking mechanism 33. The blade chassis 31 has a cutout section allowing the spring 34 articulate through the mounting surface of blade chassis 31**.

Figure 10:
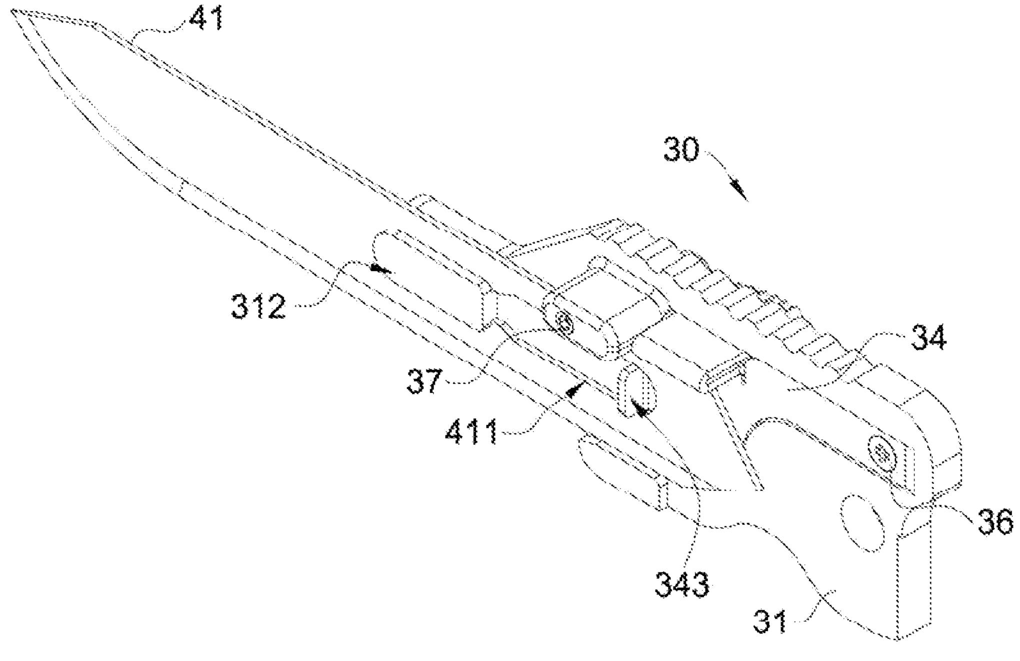
FIG. 10 shows a perspective view of the mounting surface assembly with a blade of the knife of FIG. 1 according to an embodiment of the disclosure.

FIG. 10 illustrates a perspective view of the blade chassis assembly 30 with a blade 41 of the knife assembly of FIG. 1 according to an embodiment of the disclosure. FIG. 10 shows the blade 41 affixed to the blade chassis 31, utilizing the boss 312 and the flange 343 of the spring 34 to stop motion in opposite directions. A fixed end of the spring 34 is secured to the first end (e.g., rear end) of the blade chassis 31 with the use of a fixing screw 36, creating a fixed area on the spring 34. The blade 41 has a slotted cutout section 411, which is used for the replacement of the blade 41 as described below.

Figure 11:
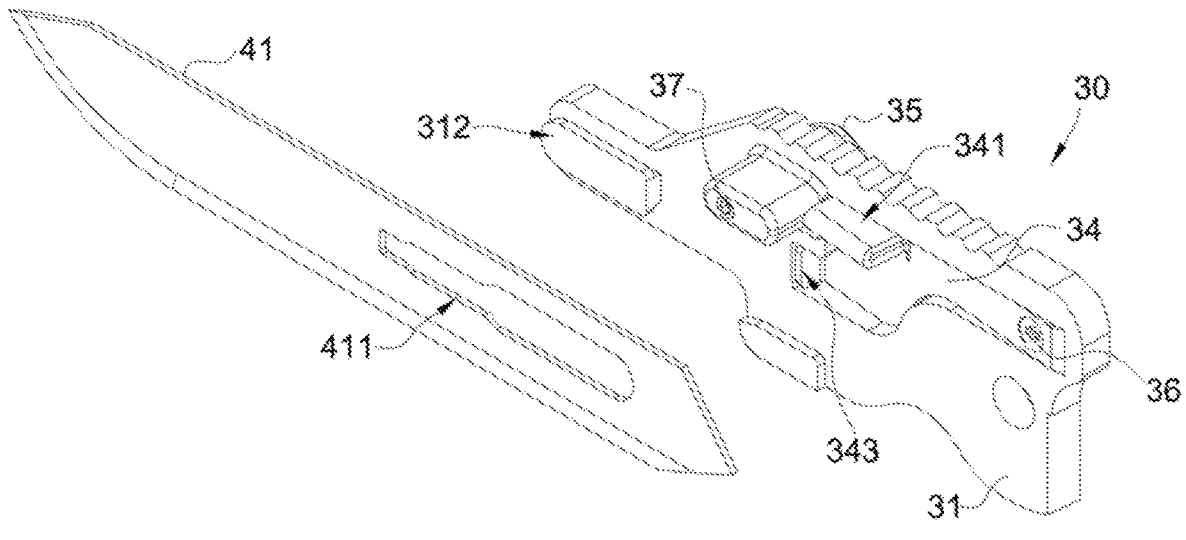
FIG. 11 is a partially exploded perspective view of FIG. 10 according to an embodiment of the disclosure.

FIG. 11 illustrates a partially exploded perspective view with the blade 41 exploded or removed from FIG. 10 according to an embodiment of the disclosure. The blade 41 may be a standard, replaceable scalpel blade (e.g., a size 60, 60 A, 15, 25 A and so forth.) The size 60 standard scalpel blade as shown in this embodiment has a standard longitudinally slotted cutout section 411 used for coupling to the blade chassis 31. The slotted cutout section 411 is attached to boss 312, which holds the blade 41 secure with an under-lip. The slotted cutout section 411 is a standardized opening that is configured to allow the blade 41 to be coupled to a wide variety of holders. The slotted cutout section 411 has narrow sections, which are narrower than the widest section, and a widest section, which is wider than the narrow sections.

FIG. 11 also illustrates the middle section 341 of the spring 34 depressed into (e.g., pressed partially through the mounting surface), causing the flange 343 to move below the mounting surface of the blade chassis 31. In a non-depressed state, both the middle section 341 and flange 343 may extend beyond the mounting surface. With the middle section 341 depressed, the blade 41 can be placed into position to be affixed to the blade chassis 31 by allowing for the motion required to mate the slotted cutout section 411 with the underlip of the boss 312. For example, the blade 41 can be placed into position by first passing the widest section of the slotted cutout section 411 over the boss 312 and touching it to the mounting surface of the blade chassis 31. A narrow section of the slotted cutout section 411 can then be attached to underlip of the boss 312 by moving the slotted cutout section 411 from the boss 312 towards the flange 343. Once the blade is in place, the release of the middle section 341 will allow the flange 343 to fully fix the blade 41 in place by moving the flange 343 above the mounting surface of the blade chassis 31 and thus, not allowing for the motion required to un-affix the slotted cutout section 411 from the underlip of the boss 312. Once the blade is fully fixed, the flange 343 will contact the rear portion (e.g., widest section) of the slotted cutout section 411, while the front bed of the boss 312 will contact the front portion (e.g., narrow section) of the slotted cutout section 411. Depression of the middle section 341 also allows for removal of the blade 41.

Figure 12:
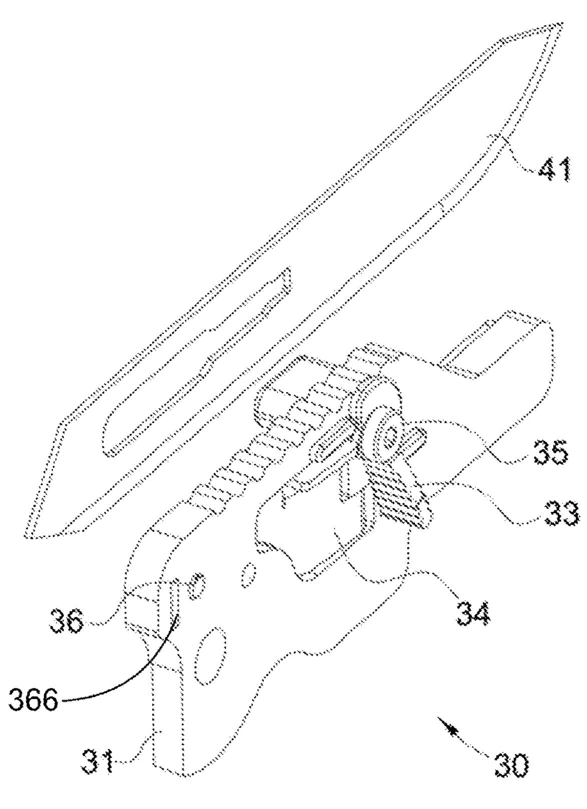
FIG. 12 is a partially exploded perspective view of FIG. 10 according to an embodiment of the disclosure.

FIG. 12 illustrates a partially exploded perspective view of FIG. 10 and different perspective of FIG. 11 according to an embodiment of the disclosure. In some embodiments, to enter an unlocked position, the locking mechanism 33 is moved (e.g., rotated downward) about a locker screw 35, which results in the un-obstruction of the middle section 341 of spring 34. The un-obstruction of the spring 34 allows the flange 343 to move past the mounting surface of the blade chassis. In some embodiments, if the locking mechanism 33 is moved into a locked position (e.g., rotated up), movement of the middle section 341 of the spring 34 is physically obstructed. Once the motion of the spring 34 is obstructed, a removable blade 41 may be locked into place by the flange 343. In some embodiments, the locking mechanism 33 may use linear movement to engage the locked and unlocked positions. The slotted section 366 is used to retain the spring 34 by holding a second flange 344, as seen in FIG. 13.

Figure 13:
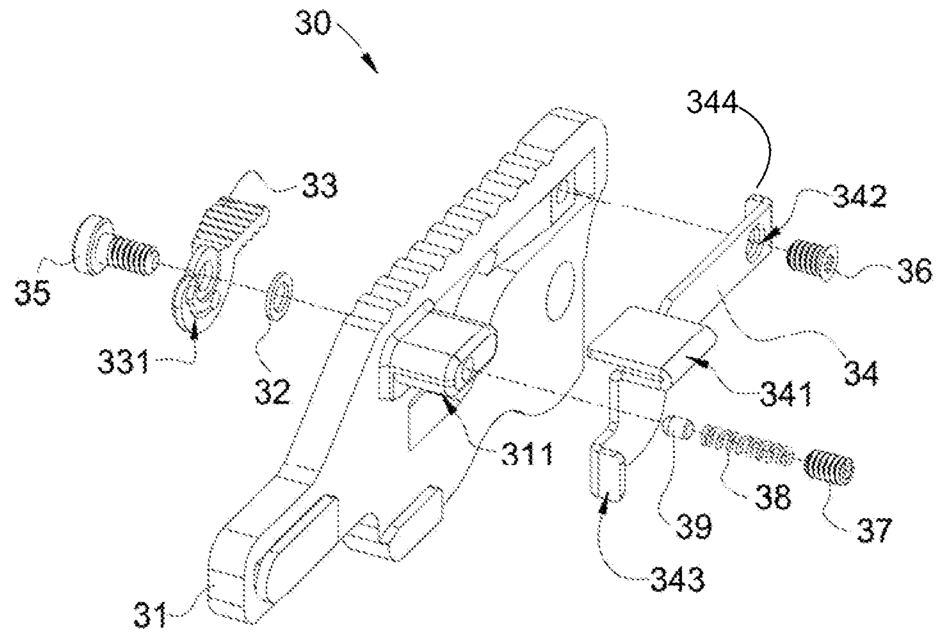
FIG. 13 is an exploded view of the blade chassis assembly of FIG. 1 according to an embodiment of the disclosure.

FIG. 13 illustrates an exploded view of the blade chassis assembly 30 of the knife assembly according to an embodiment of the disclosure. The spring 34 has three main features including a flange 343, a middle section 341, and a rear section 342. The flange 343 may be bent outward from the main surface of the blade chassis 31 and may act as a coupling component for a blade 41. The middle section 341 may be movable relative to the fixed rear section 342. The rear section 342 is fixed to the blade chassis 31 with a fixing screw 36 and a second flange 344 going into a slotted section 366 in the blade chassis 31. The spring 34 can take on many embodiments and may be reconfigured. For example, the spring 34 may have a fixed section on the front portion of the blade chassis and a moveable flange in the rear portion of the blade chassis in another embodiment. Groove 331 of the locking mechanism 33 guides the detent pin 39 between the locked and unlocked configurations.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, it will be understood that embodiments of the invention may be made from a variety of different materials.

What is claimed is:

1. A knife assembly, comprising:

a removable blade;

a blade chassis that couples with the removable blade, including:

a lever;

a detent pin housed within the lever;

a blade chassis spring configured to bias the detent pin; and a blade-coupling spring configured to couple to the removable blade; and a locking mechanism, including a groove into which the blade chassis spring biases the detent pin, configured to rotate about a locker screw and configured to:

guide the detent pin, with the groove, between a first position and a second position; and move the detent pin to the first position to obstruct a movement of the blade-coupling spring to prevent decoupling of the removable blade from the blade chassis.

2. The knife assembly of claim 1, wherein the locking mechanism is further configured to move to the second position to permit the movement of the blade-coupling spring to allow decoupling of the removable blade from the blade chassis.

3. The knife assembly of claim 1, wherein the blade-coupling spring comprises a middle section to actuate the blade-coupling spring.

4. The knife assembly of claim 1, wherein the locking mechanism is configured to move in a rotational path.

5. The knife assembly of claim 1, wherein the blade-coupling spring is fixed on a first end of the blade chassis.

6. The knife of claim 1, wherein the blade-coupling spring includes a middle section formed as a folded hem.

7. A skinning knife, comprising:

a blade;

a handle; and a blade chassis assembly attached to the handle, the blade chassis assembly including:

a lever;

a detent pin housed within the lever;

a blade chassis spring configured to bias the detent pin;

a blade-coupling spring;

a boss extending outward from a mounting surface of the blade chassis assembly to secure the blade to the mounting surface in the blade chassis assembly; and a lock, including a groove into which the blade chassis spring biases the detent pin, configured to pivot about a locking screw and prevent movement of the blade-coupling spring to avoid disengagement of the blade from the blade chassis assembly by guiding the detent pin, with the groove, to a first position of two or more positions.

8. The knife of claim 7, wherein the blade is removable.

9. The knife of claim 7, wherein the blade chassis assembly is configured to fold within the handle.

10. The knife of claim 7, wherein the blade chassis assembly is rigidly attached to the handle.

11. The knife of claim 7, wherein the lock is further configured to allow the blade-coupling spring to disengage from the blade in the blade chassis assembly when the detent pin is in a second position of the two or more positions.

12. The knife of claim 7, wherein the blade-coupling spring includes a middle section formed as a folded hem.

* * * * *